(12) United States Patent
Kim

(10) Patent No.: US 9,132,821 B2
(45) Date of Patent: Sep. 15, 2015

(54) STOP LAMP DRIVE APPARATUS

(75) Inventor: Sung Il Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 255 days.

(21) Appl. No.: 13/231,126

(22) Filed: Sep. 13, 2011

(65) Prior Publication Data

US 2012/0316729 A1 Dec. 13, 2012

(30) Foreign Application Priority Data

Jun. 13, 2011 (KR) .................. 10-2011-0057078

(51) Int. Cl.
G06F 17/00 (2006.01)
B60Q 1/44 (2006.01)
B60T 17/22 (2006.01)

(52) U.S. Cl.
CPC ............... *B60T 17/22* (2013.01); *B60Q 1/448* (2013.01)

(58) Field of Classification Search
CPC ............ B60Q 1/00; B60Q 1/44; G06F 17/00; B60T 17/22
USPC .................... 701/36; 340/465, 467
See application file for complete search history.

(56) References Cited

U.S. PATENT DOCUMENTS

| | | | | |
|---|---|---|---|---|
| 5,894,394 A | * | 4/1999 | Baba et al. | 361/87 |
| 5,900,679 A | * | 5/1999 | Lake et al. | 307/10.8 |
| 2004/0189092 A1 | * | 9/2004 | Burlak et al. | 307/10.1 |
| 2006/0273891 A1 | | 12/2006 | Quach et al. | |
| 2007/0229245 A1 | * | 10/2007 | Ikushima et al. | 340/467 |
| 2009/0045931 A1 | * | 2/2009 | Liu | 340/465 |
| 2010/0008243 A1 | * | 1/2010 | Viswanath et al. | 370/252 |
| 2011/0018441 A1 | * | 1/2011 | Tanaka et al. | 315/82 |

FOREIGN PATENT DOCUMENTS

| | | |
|---|---|---|
| JP | 2005223998 A | 8/2005 |
| KR | 10-2001-0069761 A | 7/2001 |
| KR | 10-0527952 | 3/2005 |
| KR | 10-2009-0004134 | 1/2009 |

* cited by examiner

*Primary Examiner* — Calvin Cheung
*Assistant Examiner* — Martin Weeks
(74) *Attorney, Agent, or Firm* — Mintz Levin Cohn Ferris Glovsky and Popeo, P.C.; Peter F. Corless

(57) ABSTRACT

The present invention provides a stop lamp drive circuit and apparatus. The stop lamp drive apparatus includes a stop lamp switch, a vehicle battery, and a stop signal module. The stop lamp switch outputs a signal according to an operation state of a brake pedal in a vehicle. The vehicle battery supplies operation power of a stop lamp. In the stop signal module, an external controller outputting a signal for on/off control of the stop lamp is connected to an input thereof, and the stop lamp is directly connected to an output thereof.

12 Claims, 6 Drawing Sheets

STOP LAMP DRIVE APPARATUS

CROSS-REFERENCE TO RELATED APPLICATION

This application claims under 35 U.S.C. §119(a) the benefit of Korean Patent Application No. 10-2011-0057078 filed Jun. 13, 2011, the entire contents of which are incorporated herein by reference.

BACKGROUND (a) Technical Field

The present invention relates to a stop lamp (i.e., brake lamp) drive apparatus. More particularly, it relates to a stop lamp drive apparatus with a simple circuit configuration, which can resolve various limitations such as cost, durability, and malfunctions due to typical complicated circuits and adoption of mechanical contact relays.

(b) Background Art

It is essential for a driver to maintain a safe distance from a vehicle ahead while driving to avoid the possibility of a car accident. Particularly, in vehicles with a high speed drive, the distance between vehicles rapidly and continuously changes due to variation of the relative velocity between them, and thus the driver of a vehicle following from behind should pay close attention to the front vehicle for indications that the front vehicle is going to decelerate or stop (sometimes quickly).

For this reason, stop lamps that light up when a brake pedal is pushed down are provided at the rear of a vehicle. The light emitted by the stop lamps alerts a driver following the vehicle from behind to maintain a safe distance by indicating that the brake pedal is being pushed down by the driver.

In order to turn on/off a stop lamp according to the manipulation of a brake pedal, a switch that is turned on/off at a contact point by the manipulation of the brake pedal is needed. Thus, a stop lamp switch is provided around the brake pedal of a vehicle to turn on/off power from a battery according to the manipulation of the brake pedal.

FIG. 1 shows a view illustrating a circuit configuration of a typical stop lamp drive apparatus, which illustrates a stop lamp switch 20 that is turned on/off according to the manipulation of a brake pedal. In the stop lamp drive apparatus, when a driver manipulates a brake pedal, the stop lamp switch 20 is turned on, and the power from a battery 10 is supplied to the stop lamp 70 that is an end load.

Also, on/off signals of the stop lamp switch 20 can be inputted into various controllers 60 such as an Engine Control Unit (ECU) or Electric Stability Control (hereinafter, referred to as ESC) so that the braking intentions of a driver, i.e., manipulation of a brake pedal, can be reflected in various controls of a vehicle.

Modern vehicles are equipped with an Emergency Stop Signal (ESS) system for alerting the driver of sudden braking, a Downhill Brake Control (DBC) system for allowing a vehicle to slowly go down a hill at a predetermined speed, and a Hillstart Assist Control (HAC) system for preventing a vehicle from moving backward while stopped on the slope of a hill.

Since such ESS, DBC, and HAC systems relate to braking of a vehicle, the operation of the stop lamp 70 is controlled according to the operation (on/off) of the ESS, DBC, and HAC systems. For example, since the ABS ECU or the ESC ECU is involved in the control of the ESS system, a signal according to the operation state (on/off) of the ESS is applied to the stop lamp drive apparatus from the ABS ECU or the ESC ECU. Similarly, since the ESC ECU is involved in the control of the DBC and HAC, a signal according to the operation state (on/off) of the DBC and HAC is applied to the stop lamp drive apparatus from the ESC ECU.

More specifically, a plurality of relays 41 and 42 that are turned on/off by a signal according to the operation state of the ESS, DBC, and HAC, i.e., a relay drive signal of an external controller (ABS/ESC ECU) 50 are disposed in the stop lamp drive apparatus such that the lighting state of the stop lamp 70 can be controlled by the operation state of ESC, DBC, and HAC. In this case, each of the relays 41 and 42 is connected to an output of a stop signal electronic relay module 30 that turns power on/off from a battery according to a signal of the stop lamp switch 20, and selectively applies battery power that is applied through the stop signal electronic relay module 30 according to the operation state signal (relay drive signal) of the ESS, DBC, and HAC of the ABS ECU and ESC ECU that are braking-related controllers to the stop lamp 70 as a load.

As shown in FIG. 1, the relays 41 and 42 may include an ESS relay and an DBC/HAC relay in a typical stop lamp drive apparatus. A contact of each of respective relays 41 and 42 is connected to an output of the stop signal electronic relay module 30 to turn on/off power from a battery, and an exciter thereof is connected to an output of the external controller 50 such as the ABS ECU and the ESC ECU.

However, the stop lamp drive apparatus as configured above has limitations described below.

First, a plurality of mechanical contact relays 41 and 42 are used, and a complicated wiring configuration is needed to connect the contact relays 41 and 42 to the stop signal electronic relay module 31, the respective controllers (ABS ECU and ESC ECU) 50, and the stop lamp 70. This causes an increase in costs of parts and fabrication. Also, since the mechanical contact relays 41 and 42 are used in plurality, there are limitations in durability, damage, and malfunction of the relays. In addition, there is a limitation in terms of reliability and stability of the operation due to a complicated wiring configuration and an increase of the length of wiring that are required.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a stop (brake) lamp drive apparatus with improved reliability and stability of the operation thereof, which can be simply configured in terms of circuit and wiring, and can decrease costs, increase durability, and decrease the likelihood of malfunction due which are common in the typical complicated circuit configuration which adopts a plurality of mechanical contact relays.

In one aspect, the present invention provides a stop (brake) lamp drive apparatus including: a stop lamp switch outputting a signal according to an operation state of a brake pedal in a vehicle; a vehicle battery supplying operation power to a stop lamp; and a stop signal module in which an external controller outputting a signal for on/off control of the stop lamp is connected to an input thereof, and the stop lamp is directly connected to an output thereof.

In a preferred embodiment, the stop signal module may include: a semiconductor switch selectively applying power from the vehicle battery to the stop lamp according to turning on/off power from the vehicle battery; and a switch driving circuit unit applying a switch drive signal for turning on/off the semiconductor switch based on signals from the stop lamp switch and the external controller.

In another preferred embodiment, the stop signal module may be configured in a single unit including: a connector with input/output terminals for connection of and to the stop lamp switch, the battery, the external controller, and the stop lamp; a printed circuit board mounted with electronic components constituting the switch driving circuit unit and the semiconductor switch; and a housing configured to receive the printed circuit board and mounted with the connector on one side thereof.

In still another preferred embodiment, the external controller may be a controller that outputs a signal according to an operation state of at least one of an emergency stop signal system for alerting the driver of sudden braking, a downhill brake control system for allowing the vehicle to slowly go down a hill at a predetermined speed, and a hillstart assist control system for preventing a vehicle from rolling backward while facing uphill.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
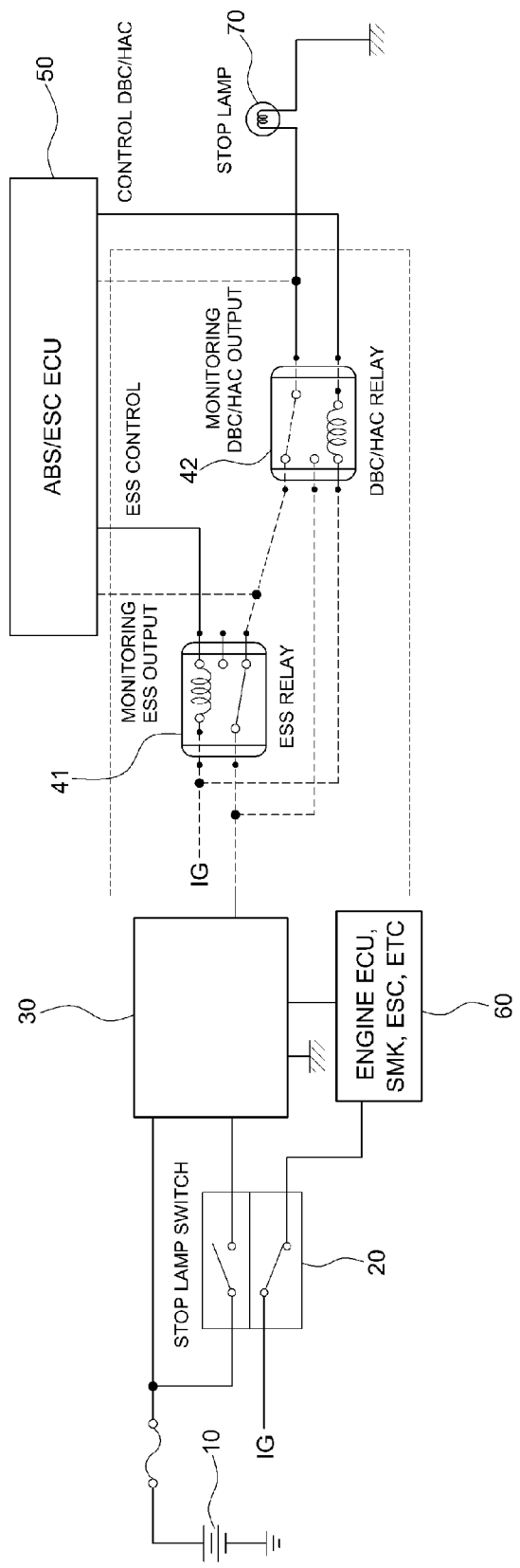
FIG. 1 is a diagram illustrating a circuit configuration of a typical stop lamp drive apparatus.

Reference numerals set forth in the Drawings includes reference to the following elements as further discussed below:

10: battery
20: stop lamp switch
30: electronic relay module
31: stop signal module
31a: housing
32: input (input terminal)
33: switch driving circuit unit
34: semiconductor switch
35: internal circuit
36: output (output terminal)
37: connector
38: printed circuit board
41: ESS relay
42: DBC/HAC relay
50: external controller
51: ABS ECU
52: ESC ECU
60: external controller
70: stop lamp It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings.

The present disclosure relates to a stop (brake) lamp drive apparatus. More specifically, it relates to a stop lamp drive apparatus that can be simply configured compared to the related art by using a stop signal module in which a stop lamp switch outputting a signal according to the operation state of a brake pedal, a vehicle battery supplying power to a stop lamp, and an external controller outputting a signal for on/off control of the stop lamp are connected to an input, and the stop lamp that is an end load is connected to an output, and the stop signal module The stop signal module may be configured to selectively apply battery power to a stop lamp as a load according to on/off signals of a stop lamp switch and signals of external controllers (ABS ECU and ESC ECU), and may be modularized in a signal product including a mechanical contact relay function.

When the stop signal module that is provided in a single unit is used in the circuit of a stop lamp drive apparatus according to an embodiment of the present invention, the circuit configuration of the stop lamp drive apparatus can be simplified compared to a related art, and wiring and circuit configuration works can be more easily performed in a assembly line of vehicles.

By utilizing the above invention, costs can be decreased, durability can be increased and malfunctions due to adoption of a typically complicated circuit configuration and a plurality of mechanical contact relays can be sufficiently overcome, thereby improving the reliability and stability of the operation.

Figure 2:
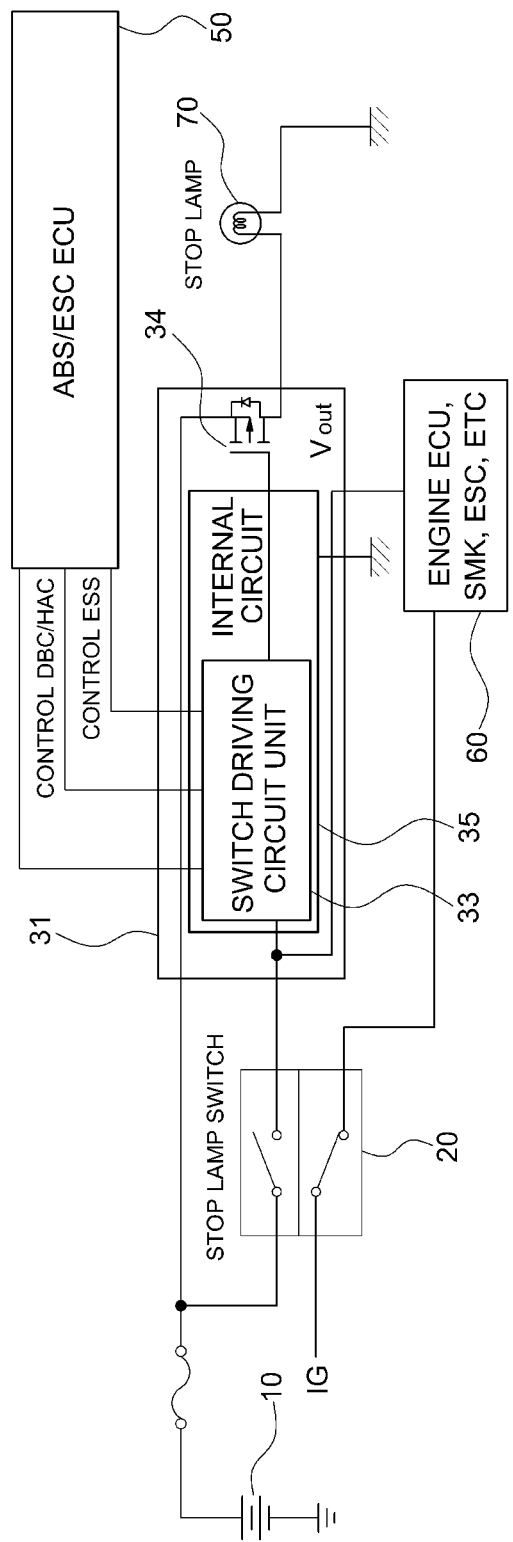
FIG. 2 is a diagram illustrating a circuit configuration of a stop lamp drive apparatus according to an embodiment of the present invention.

FIG. 2 is a diagram illustrating a circuit configuration of a stop lamp drive apparatus according to an embodiment of the present invention. As shown in FIG. 2, the stop lamp drive apparatus may include a stop signal module 31 which replaces the complicated circuit configuration such as wiring and a mechanical contact switch among a battery 10, a stop lamp switch 20, an external controller 50, and a stop lamp 70.

In the stop signal module 31, the battery 10, the stop lamp switch 20, and the external controller 50 may be disposed at an input side, and an output is directly connected to the stop lamp 70. Here, the external controller 50 may be a controller for outputting a signal according to the operation state of at least one of an ESS, DBC, and HAC. For example, the external controller 50 may include an ABS ECU and an ESC ECU.

A separate external controller 60 such as an engine (ECU), SMK module, or ESC ECU may be further connected to a separate output of the stop signal module 31 so that the on/off signals of the stop lamp 70 can be dividedly delivered. The stop signal module 31 may be configured to relay the on/off signals of the stop lamp switch 20 to the engine ECU, SMK module, or ESC ECU 60 such that a braking intention of a driver, i.e., the operation state of a brake pedal can be reflected in various controls of a vehicle. For this, a separate output may be provided in the stop signal module 31 to output signals to the engine ECU, SMK module, or ESC ECU 60.

Figure 3:
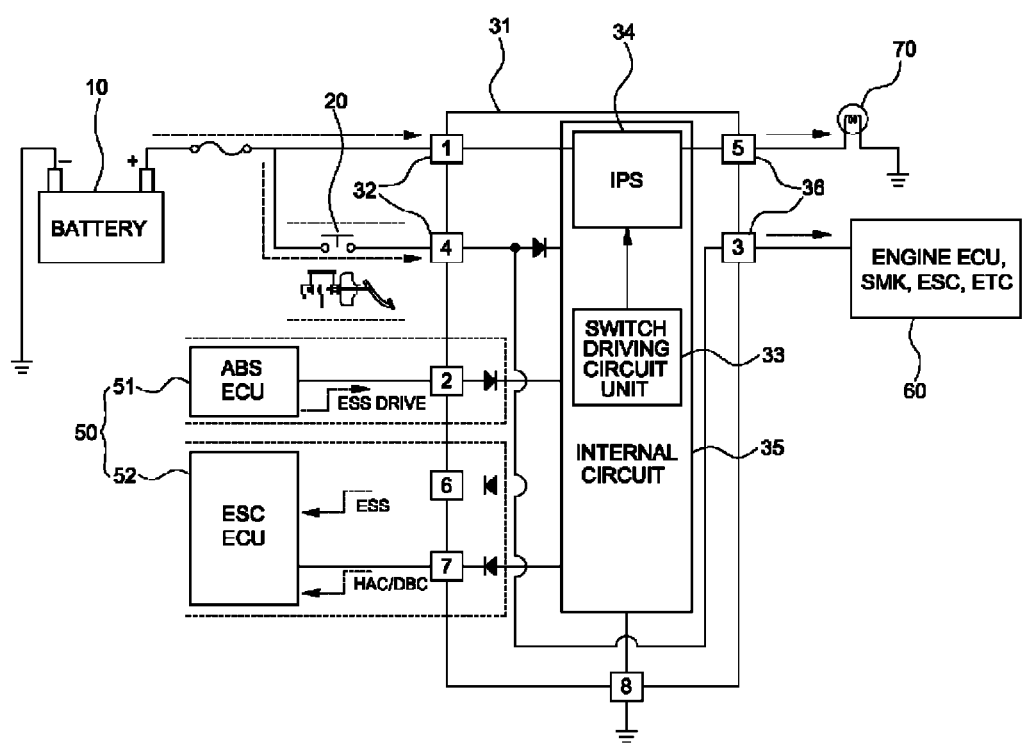
FIG. 3 is a diagram illustrating a circuit connection state of a stop signal module in a stop lamp drive apparatus according to an embodiment of the present invention.

FIG. 3 is a diagram illustrating a circuit connection state of a stop signal module in a stop lamp drive apparatus according to an embodiment of the present invention. The output of the battery 10 may be wired to a first input 32 (i.e., the input terminal 1 in FIG. 3) of the stop signal module 31 to supply operation power of the stop lamp 70. Also, the signal output of the stop lamp switch 20 and the signal output of the external controller 50 may be wired to the inputs, respectively.

In FIG. 3, the output of the stop lamp switch 20 may be connected to a second input 32 (i.e., the input terminal 4) of the stop signal module 31, and the inputs 2, 6 and 7 of the stop signal module 31 may be connected to the signal output of the ABS ECU 51 and the ESC ECU 52 such that signals (operation on/off signals) according to the operation state of the ESS can be inputted. Also, the stop signal module 31 may include a ground (i.e., the ground terminal 8) for ground connection of a vehicle body. A third output (i.e. output terminal 3) for outputting the on/off signals inputted from the stop lamp switch 20 may be wired to separate external controllers 60 such as the engine ECU, SMK module, and ESC ECU.

In addition, the stop lamp 70 that is a load may be wired to an output 5 of the stop signal module 31. Thus, the stop signal module 31 including a total of eight inputs/outputs 31 and 36 is illustrated in FIG. 3. To explain the internal configuration of the stop signal module 31, the stop signal module 31 may include circuit configuration for selectively turning on/off the power from the battery 10 according to signals of the external controller 50 and the stop lamp switch 20. The stop signal module 31 may include a semiconductor switch 34 that selectively applies battery power to the stop lamp 70 according to turning on/off power from the battery, a switch driving circuit unit 33 that applies a switch drive signal for turning on/off the semiconductor switch 34 based on signals of external controllers (ABS ECU and ESC ECU) 50, 51 and 52 related to the control of the stop lamp 70 and the stop lamp switch 20, and an internal circuit 35 including other electronic components (e.g., capacitor) for preventing surge voltage/current, electromagnetic waves, and noise radiation.

The semiconductor switch 34 may include an Intelligent Power Switch (ISP) capable of replacing fuses and relays for vehicles, and known semiconductor switches such as MOS-FET and IGBT. The switch driving circuit unit 33 may be configured to apply on/off signals (high/low signals) according to external input signals using a multiplexer (MUX) without a separate Micom. The switch driving circuit unit 33 may output switch drive signals for turning on/off the semiconductor switch 34 according to the input signals (high/low signals) that are applied from the stop lamp switch 20 and the external controller 50.

For example, the battery power may be connected to a collector of the semiconductor switch 34, and the output of the switch driving circuit unit 33 may be connected to the gate of the semiconductor switch 34. In this case, when the semiconductor switch 34 is turned on/off according to a switch drive signal applied by the switch driving circuit unit 33, i.e., gate drive signal, the battery power may be selectively applied to the stop lamp 70.

Figure 4:
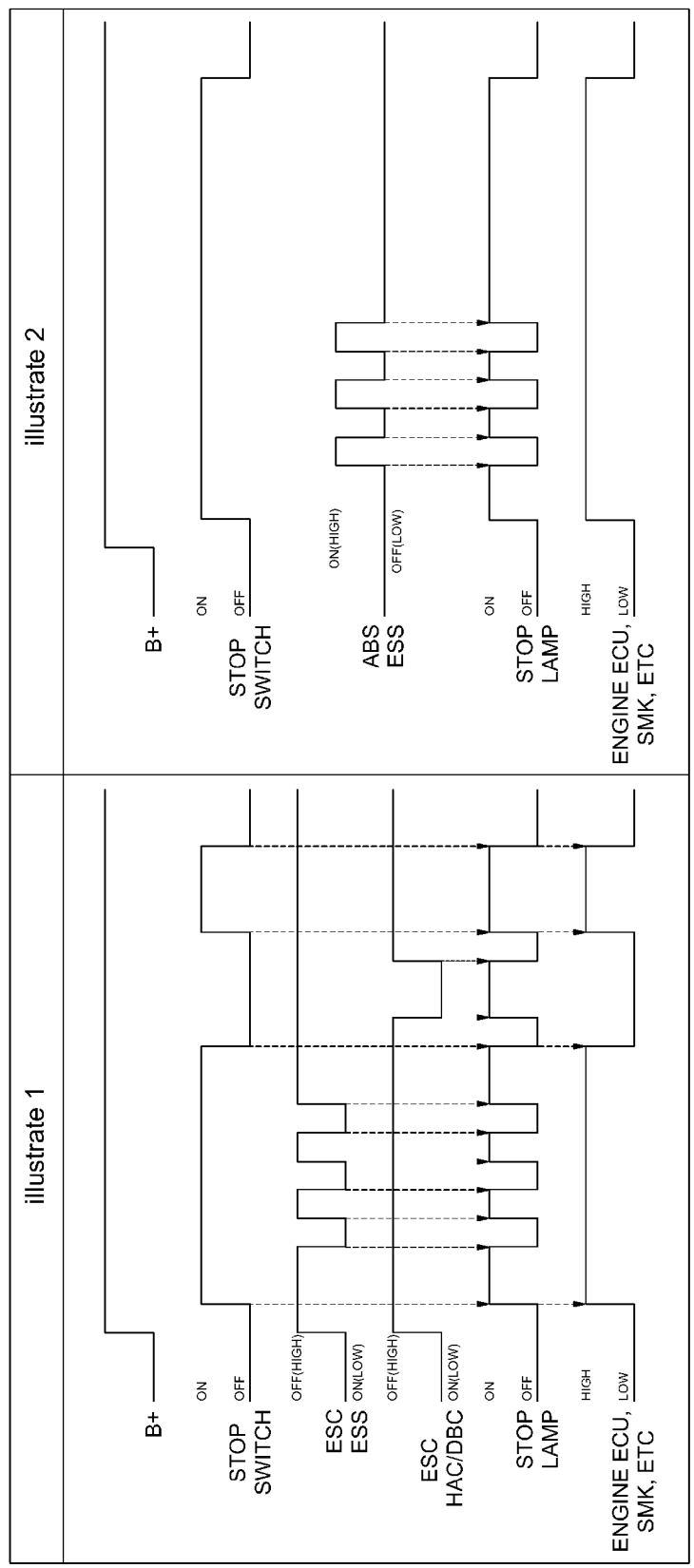
FIG. 4 is a diagram illustrating a control state of a stop lamp according to signals of external controllers (ESC ECU and ABS ECU) and a stop lamp switch.

FIG. 4 is a diagram illustrating a lighting state of a stop lamp when a semiconductor switch is turned on/off according to signals of external controllers (the ESC ECU or the ABS ECU) and a stop lamp switch. FIG. 4A illustrates an on/off control state of the stop lamp according to an input signal (i.e., the signal of the stop lamp switch 20) in a vehicle in which the ESC ECU controls the ESS and the HAC/DBC, and FIG. 4B illustrates the on/off control state of the stop lamp according to an input signal (a signal of ECU) in a vehicle in which the ABS ECU controls the ESS.

The circuit configuration for controlling turning-on/off of the semiconductor switch and lighting-on/off of the stop lamp, i.e., the circuit of the switch driving circuit unit may be variously configured such that the control state is shown like that in FIG. 4A or 4B according to input signals.

In FIG. 4A, when ESS is switch to an off state and the stop lamp switch is in on-state, the stop lamp turns off. Although the stop lamp switch is in off-state, when the HAC/DBC turns on, the stop lamp respectively turns on as well.

In FIG. 4B, when the ESS turns on in a state where the stop lamp switch is in on-state, the stop lamp is allowed to turn off as a result.

Alternatively, the stop signal module 31 may include a battery power source, an input terminal 32 which signals from an external controller 50 and a stop lamp switch 20 are inputted into, an output terminal 36 for outputting power to a stop lamp 70 and output signals to a separate external controller 60. Such a structure of the stop signal module 31 is shown in FIGS. 5 through 7.

Figure 5:
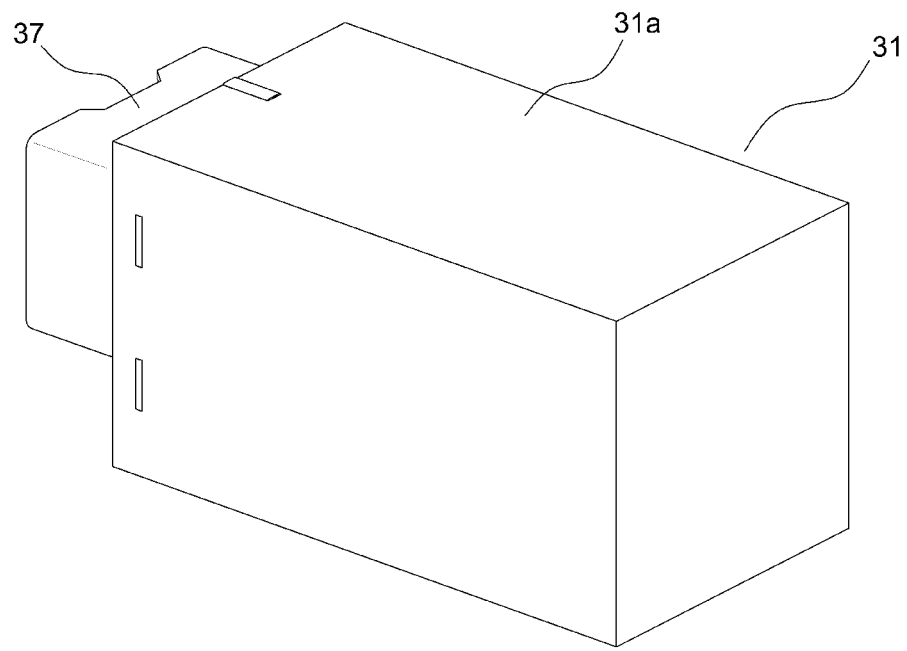
FIGS. 5 through 7 are diagrams illustrating a stop signal module in a stop lamp drive apparatus according to an embodiment of the present invention.
Figure 6:
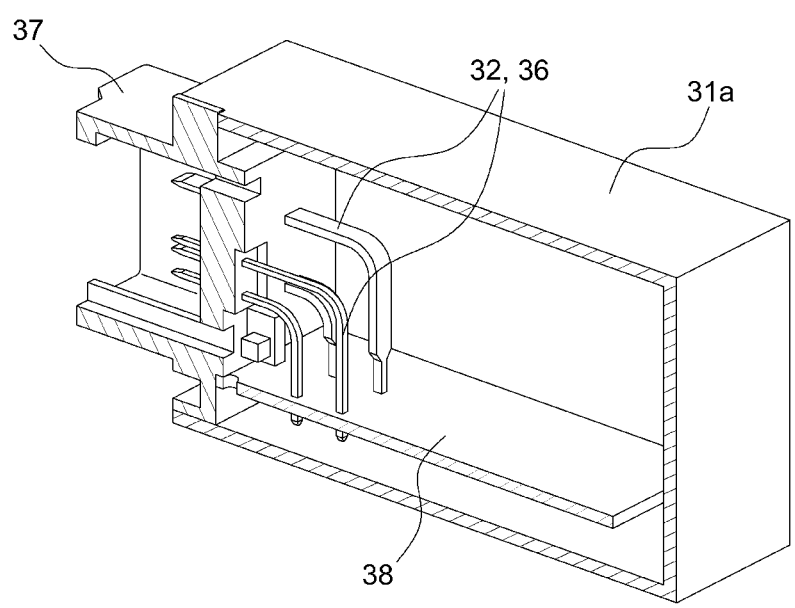
Figure 7:
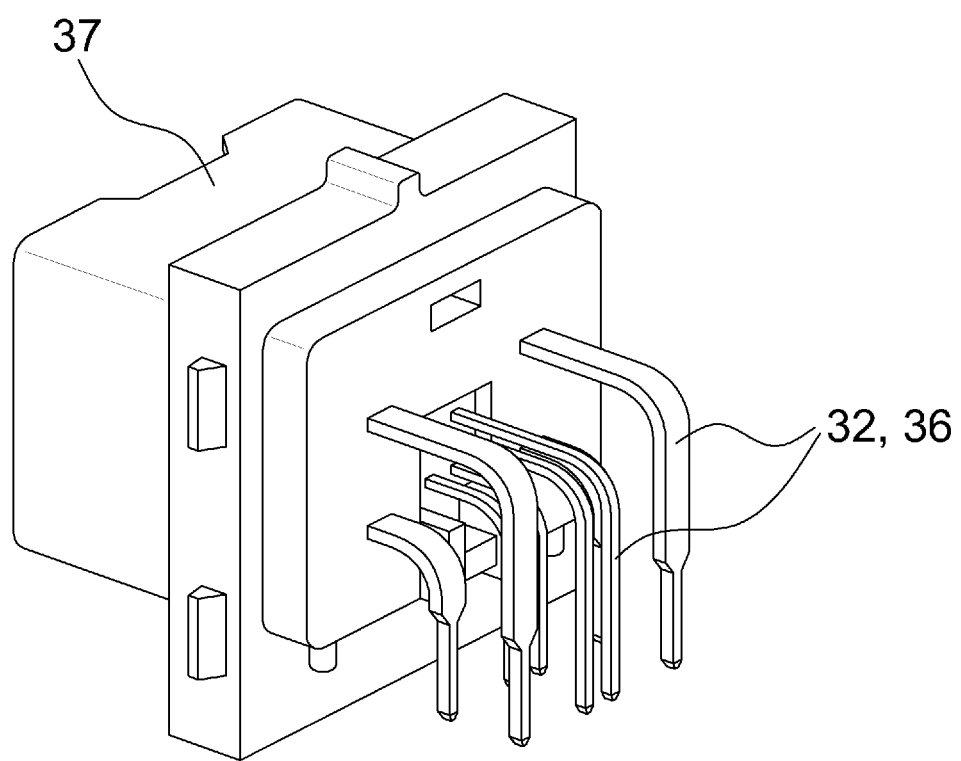

FIGS. 5 and 6 are a perspective view and a cross-sectional view illustrating the overall exterior of the illustrative embodiment of the present invention, respectively. FIG. 7 is a perspective view illustrating a connector and terminals separated from a housing and a printed circuit board. The stop signal module 31 may include a connector at one side of a housing 31a. The connector 37 may house terminals (input/output terminals) 32 and 36 for external connection. The housing 31a may house a printed circuit board (PCB) 38 mounted with electronic components constituting the switch driving circuit unit and the semiconductor switch together with an internal circuit. The terminals 32 and 36 of the connector 37 may be connected to a connection part of the PCB 38.

Accordingly, a battery and external controllers such as the ABS ECU, and the ESC ECU that are input elements, a stop lamp and a separate external controller such as the engine ECU that are output elements, and a separate external connector wired to the ground of the vehicle body are connected to the connector of the stop signal module, the stop signal module and the respective input/output elements are electrically connected to each other. Thus, by using a stop signal module in which a battery, a stop lamp switch, and an external controller may be connected to the input side, and a stop lamp may all be connected to the output side, the circuit configuration of a stop lamp drive apparatus can be simplified compared to a related art.

Particularly, since the stop signal module may be configured in a single unit capable of replacing a typical ESS relay and DBC/HAC relay by including a semiconductor switch and a switch driving circuit unit, simplification of the circuit configuration, easiness of wiring and circuit configuration work, and cost saving can be achieved.

Thus, a stop lamp drive apparatus may use a stop signal module. In the stop signal module, a stop lamp switch outputting a signal according to the operation state of a brake pedal, a vehicle battery supplying power to a stop lamp, and an external controller outputting a signal for on/off control of the stop lamp may be connected to an input, and the stop lamp that is an end load may be connected to an output, and the stop signal module. Particularly, the stop signal module may include a mechanical relay function. Accordingly, the overall circuit configuration of the stop lamp drive apparatus can be simplified compared to a related art, and wiring and circuit configuration can be more easily performed.

Also, costs can be saved due to the use of a simple circuit configuration, and limitations in durability and malfunction due to adoption of a typical complicated circuit configuration and a plurality of mechanical contact relays can be sufficiently overcome, thereby improving the reliability and stability of the operation and the quality of vehicles.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A stop lamp drive apparatus comprising:
   a brake lamp switch outputting signals according to an operation state of a brake pedal in a vehicle;
   a vehicle battery supplying power to a stop lamp to permit the stop lamp to emit light therefrom; and
   a stop signal module in which an external controller outputting a signal for on/off control of the stop lamp is connected to an input of the stop signal module, and the stop lamp is directly connected to an output of the stop signal module,
   wherein the vehicle battery and the brake lamp switch are connected to an input of the stop signal module to selectively and directly supply operation power of the stop lamp according to the operation state of the brake pedal in the vehicle,
   wherein the stop signal module is configured to apply the signal for on/off control of the stop lamp according to external input signals using a multiplexer (MUX) without including or being connected to a separate microprocessor.

2. The stop lamp drive apparatus of claim 1, wherein the stop signal module comprises:
   a semiconductor switch selectively applying power of the vehicle battery to the stop lamp according to turning on/off power to the battery; and
   a switch driving circuit unit applying a switch drive signal for turning on/off the semiconductor switch based on the signals of the stop lamp switch and the external controller.

3. The stop lamp drive apparatus of claim 2, wherein the stop signal module is configured in a single unit comprising:
   a connector with input/output terminals for connection of the stop lamp switch, the battery, the external controller, and the stop lamp;
   a printed circuit board mounted with electronic components constituting the switch driving circuit unit and the semiconductor switch; and
   a housing receiving the printed circuit board and mounted with the connector at one side thereof.

4. The stop lamp drive apparatus of claim 1, wherein the external controller is a controller that outputs a signal according to an operation state of at least one of
   an emergency stop signal system for alarming sudden braking,
   a downhill brake control system for allowing the vehicle to slowly go down a hill at a predetermined speed, and
   a hillstart assist control system for preventing a vehicle from rolling backward down a hill while facing uphill.

5. The stop lamp drive apparatus of claim 2, wherein
   the vehicle battery is connected to a collector of the semiconductor switch, and
   the switch driving circuit unit is connected to a gate of the semiconductor switch such that when the semiconductor switch is turned on/off according to a switch drive signal applied by the switch driving circuit unit, the battery power is selectively applied to the stop lamp.

6. The stop lamp drive apparatus of claim 2, wherein the switch driving circuit unit is configured to apply the signal for on/off control of the stop lamp according to signals of
   an emergency stop system,
   a hillstart assist control system, and
   the stop lamp switch.

7. A brake lamp drive circuit in a vehicle comprising:
   a stop lamp switch outputting a signal according to an operation state of a brake pedal in a vehicle;
   a battery supplying power to a brake lamp to permit the brake lamp to emit light therefrom; and
   a module in which an external controller outputting a signal for on/off control of the stop lamp is connected to an input of the module, and the brake lamp is directly connected to an output of the module,
   wherein the battery and the stop lamp switch are connected to an input of the module to selectively and directly supply operation power of the brake lamp according to an operation state of the brake pedal in the vehicle,
   wherein the module is configured to apply the signal for on/off control of the brake lamp according to external input signals using a multiplexer (MUX) without including or being connected to a separate microprocessor.

8. The brake lamp drive circuit of claim 7, wherein the module comprises:
   a semiconductor switch selectively applying power of the battery to the brake lamp according to turning on/off power to the battery; and
   a switch driving circuit unit applying a switch drive signal for turning on/off the semiconductor switch based on the signals of the stop lamp switch and the external controller.

9. The brake lamp drive circuit of claim 8, wherein the module is configured in a single unit comprising:

a connector with input/output terminals for connection of the stop lamp switch, the battery, the external controller, and the stop lamp;

a printed circuit board mounted with electronic components constituting the switch driving circuit unit and the semiconductor switch; and a housing receiving the printed circuit board and mounted with the connector at one side thereof.

10. The brake lamp drive circuit of claim 7, wherein the external controller is a controller that outputs a signal according to an operation state of at least one of an emergency stop signal system for alerting the driver of sudden braking, a downhill brake control system for allowing the vehicle to slowly go down a hill at a predetermined speed, and a hillstart assist control system for preventing a vehicle from rolling backward down a hill while facing uphill.

11. The brake lamp drive circuit of claim 8, wherein the vehicle battery is connected to a collector of the semiconductor switch, and the switch driving circuit unit is connected to a gate of the semiconductor switch such that when the semiconductor switch is turned on/off according to a switch drive signal applied by the switch driving circuit unit, the battery power is selectively applied to the stop lamp.

12. A stop lamp drive apparatus comprising:

a stop lamp switch outputting signals according to an operation state of a brake pedal in a vehicle;

a vehicle battery supplying power to a stop lamp to permit the stop lamp to emit light therefrom; and a stop signal module in which an external controller outputting a signal for on/off control of the stop lamp is connected to an input of the stop signal module, and the stop lamp is directly connected to an output of the stop signal module, wherein the vehicle battery and the stop lamp switch are connected to an input of the stop signal module to selectively and directly supply operation power of the stop lamp according to the operation state of the brake pedal in the vehicle, wherein the stop signal module comprises:

a semiconductor switch selectively applying power of the vehicle battery to the stop lamp according to turning on/off power to the battery; and a switch driving circuit unit applying a switch drive signal for turning on/off the semiconductor switch based on the signals of the stop lamp switch and the external controller, wherein the vehicle battery is connected to a collector of the semiconductor switch, the switch driving circuit unit is connected to a gate of the semiconductor switch such that when the semiconductor switch is turned on/off according to a switch drive signal applied by the switch driving circuit unit, the battery power is selectively applied to the stop lamp, and the switch driving circuit unit is configured to apply the signal for on/off control of the stop lamp according to external input signals using a multiplexer (MUX) without including or being connected to a separate microprocessor.

* * * * *